United States Patent Office 3,028,438
Patented Apr. 3, 1962

3,028,438
STABILIZING BROMO-SUBSTITUTED
ACETYLENIC COMPOUNDS
John E. Mahan and Roger F. Kleinschmidt, Bartlesville, Okla., assignors to Phillips Petroleum Company, a corporation of Delaware
No Drawing. Filed May 4, 1959, Ser. No. 810,533
8 Claims. (Cl. 260—652.5)

This invention relates to a method of stabilizing bromo-substituted acetylenic compounds. In another aspect the invention relates to a stable composition comprising a bromo-substituted acetylenic compound and a stabilizing agent.

Acetylenic bromides which contain a bromine atom on a tertiary propargylic carbon are extremely reactive and very unstable. Such components are far more unstable than other types of halogenated compounds such as perchloroethylene and the like. These compounds are so unstable that they readily decompose as evidenced by discoloration under the action of heat and/or light, even when stored under an inert gas such as nitrogen. Although these compounds are useful as agricultural chemicals, such as nematocides or herbicides, or as chemical intermediates, such as in the synthesis of Vitamin A homologs, effective stabilization of these compounds is necessary before they can be fully developed commercially.

We have discovered that acetylenic compounds having the formula

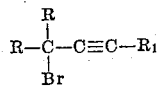

wherein $R_1$ is selected from the group consisting of hydrogen, an alkyl group containing from 1 to 3 carbon atoms, and

and where the two R groups on a propargylic carbon contain a total of not over 5 carbon atoms and are selected from the group consisting of alkyl radicals having from 1 to 3 carbon atoms and alkylene radicals linked together so that with the propargylic carbon they form a cycloalkyl radical which can be stabilized by the addition of a stabilizing amount of a compound selected from the group consisting of 3-methyl-3-hydroxy-1-butyne and 3 methyl-3-hydroxy-1-pentyne.

It is an object of our invention to provide a method of stabilizing bromo-substituted acetylenic compounds. Another object is to provide a stable composition comprising a bromo-substituted acetylenic compound and a stabilizing agent. Other objects, advantages and features of our invention will be apparent to those skilled in the art from the following discussion.

The bromine-substituted acetylenic compounds to which our invention applies have a general formula as given above and include such compounds as 3-methyl-3-bromo-1-butyne, 1 ethynylcyclohexyl bromide, 3-methyl-3-bromo-1-pentyne, 2,5-dimethyl-2,5-dibromo-3-hexyne, 3-bromo-3-methyl-1-hexyne, 5-bromo-5-ethyl-3-octyne, 3,6-dibromo-3-ethyl-6-methyl-4-nonyne, 1,2-di-(1-bromocyclohexyl)ethyne and 1-(1-bromocyclopentyl)-1-butyne.

The compounds of the above formulas are extremely reactive and unstable because of two structural similarities. In each of these compounds, the bromine is connected in a propargylic location, that is, on the first carbon removed from a carbon attached to a triple bond. In addition, the bromine atom in each of these compounds is connected to a tertiary carbon. This combination of structural similarities renders each one of these compounds extremely reactive and very unstable. The alkyl substituents do not affect this reactivity so long as they are small, i.e., not over 3 carbon atoms each or over 5 carbon atoms total on a single propargylic carbon as stated in the above-given general formula.

The amount of either 3-methyl-3-hydroxy-1-butyne or 3-methyl-3-hydroxy-1-pentyne needed to stabilize any one of the above-given compounds will depend to a certain extent upon the compound being stabilized. It is desirable to use a minimum of stabilizing agent and the proper amount to be used can readily be determined by one skilled in the art. Generally the amount of stabilizer is within the range of 0.25 to 3.0 volume percent based on the volume of the bromine-substituted acetylenic compound to be stabilized. Preferably the amount of stabilizer is between 0.5 and 1.5 volume percent on the same basis. The method of adding the stabilizer is not particularly important but a good mixture should be obtained.

The bromine-substituted acetylenic compounds can be prepared by reaction of the corresponding hydroxy-substituted acetylenic compound with phosphorus tribromide followed by purification to obtain the desired product. These compounds which are stabilized by our invention are useful as agricultural chemicals and as chemical intermediates as above described.

The following specific example illustrates the effectiveness of the stabilizer of our invention but it is not intended that the invention be limited to the particular embodiment shown.

EXAMPLE

A run was made in which 3-methyl-3-bromo-1-butyne was prepared by the reaction of 3-methyl-3-hydroxy-1-butyne with phosphorus tribromide.

In this run, 84 grams of 3-methyl-3-hydroxy-1-butyne was charged to a 300 ml. flask. The flask was then flushed with $CO_2$, and 128 grams of phosphorus tribromide was added dropwise over a period of 1 hour and 25 minutes. It was necessary to supply cooling as the reaction was exothermic. The reaction mixture was then allowed to stand overnight, after which it was washed with water, aqueous sodium bicarbonate, and again with water. An oily layer, amounting to 215.8 grams separated off. Drierite was then added to this oily material, and the resulting mixture was allowed to stand for 2–3 days, after which it was flashed through a 6-inch Vigreaux column. The distillate was then dried over magnesium sulfate, and after two to three days, the material was filtered and distilled through a 6-inch packed column. The cut boiling at 53–61° C. at 140–145 mm. amounted to 25.0 ml. and had a refractive index of 1.4653 at 20° C. This material was 3-methyl-3-bromo-1-butyne and had a slight yellow color.

Three 5 ml. portions of this material were then treated in the following manner. Sample A was covered with air and capped, Sample B was covered with nitrogen and capped, and 0.8 volume percent based on the bromo-substituted compound of 3-methyl-3-hydroxy-1-butyne was added to Sample C, after which it was covered with nitrogen and capped.

Decomposition of the 3-methyl-3-bromo-1-butyne is indicated by discoloration or yellowing. Three days later Sample A was a darker yellow, Sample B was slightly darker than the original color, and Sample C was virtually unchanged. Checks were made at 5, 7 and 10 days with the following results:

*Hellige Color Number*

| Sample | After 5 Days | After 7 Days | After 10 Days |
|---|---|---|---|
| A | 11 | 11 | 11 |
| B | 9 | 10 | 10 |
| C | 4 | 4 | 4 |

The higher Hellige color numbers indicate greater discoloration.

It can be seen from the above data that 3-methyl-3-hydroxy-1-butyne is an effective stabilizer for 3-methyl-3-bromo-1-butyne.

As will be evident to those skilled in the art, various modifications of this invention can be made, or followed, in the light of the foregoing disclosure and discussion, without departing from the spirit or scope thereof.

We claim:

1. The method of stabilizing against discoloration a bromo-substituted acetylenic compound having the formula

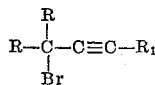

wherein $R_1$ is selected from the group consisting of hydrogen, an alkyl group containing from 1 to 3 carbon atoms, and

and wherein two R groups on a propargylic carbon contain not over 5 carbon atoms and are selected from the group consisting of alkyl radicals having from 1 to 3 carbon atoms and alkylene radicals linked together so that with the propargylic carbon they form a cycloalkyl radical which comprises adding to said compound from 0.25 to 3.0 volume percent, based on the volume of the bromo-substituted acetylenic compound, of a compound selected from the group consisting of 3-methyl-3-hydroxy-1-butyne and 3-methyl-3-hydroxy-1-pentyne.

2. The method of claim 1 wherein 3-methyl-3-hydroxy-1-pentyne is added in an amount between 0.5 to 1.5 volume percent.

3. The method of claim 1 wherein 3-methyl-3-hydroxy-1-butyne is added in an amount between 0.5 to 1.5 volume percent.

4. The method of claim 3 wherein said acetylenic compound is 3-methyl-3-bromo-1-butyne.

5. A color stable composition comprising a compound having the formula

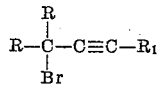

wherein $R_1$ is selected from the group consisting of hydrogen, an alkyl group containing from 1 to 3 carbon atoms, and

and wherein two R groups on a propargylic carbon contain not over 5 carbon atoms and are selected from the group consisting of alkyl radicals having from 1 to 3 carbon atoms and alkylene radicals linked together so that with the propargylic carbon they form a cycloalkyl radical and from 0.25 to 3.0 volume percent, based on the volume of the bromo-substituted acetylenic compound, of a compound selected from the group consisting of 3-methyl-3-hydroxy-1-butyne and 3-methyl-3-hydroxy-1-pentyne.

6. The composition of claim 5 wherein 3-methyl-3-hydroxy-1-butyne is present in an amount from 0.5 to 1.5 volume percent, based on the volume of the bromo-substituted acetylenic compound.

7. The composition of claim 5 wherein 3-methyl-3-hydroxy-1-pentyne is present in an amount from 0.5 to 1.5 volume percent, based on the volume of the bromo-substituted acetylenic compound.

8. A color stable composition comprising 3-methyl-3-bromo-1-butyne and from 0.5 to 1.5 volume percent, based on the butyne, of 3-methyl-3-hydroxy-1-butyne.

References Cited in the file of this patent

UNITED STATES PATENTS

| 2,775,624 | Skeeters | Dec. 25, 1956 |
| 2,838,458 | Bachtel | June 10, 1958 |
| 2,841,625 | Burch et al. | July 1, 1958 |

FOREIGN PATENTS

| 764,233 | Great Britain | Dec. 11, 1956 |